United States Patent [19]
Van Der Wal et al.

[11] Patent Number: 6,014,255
[45] Date of Patent: *Jan. 11, 2000

[54] POLARIZING BEAM SPLITTER AND MAGNETO-OPTIC READING DEVICE USING THE SAME

[75] Inventors: Johannes Van Der Wal, Nuenen; Willem G. Ophey, Eindhoven, both of Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/942,678

[22] Filed: Oct. 2, 1997

Related U.S. Application Data

[63] Continuation of application No. 08/387,756, filed as application No. PCT/IB94/00170, Jun. 23, 1994, abandoned.

[30] Foreign Application Priority Data

Jun. 25, 1993 [BE] Belgium ............................... 09300661
Jun. 13, 1994 [EP] European Pat. Off. .............. 94201684

[51] Int. Cl.$^7$ ................................. G02B 5/30; G11B 7/00
[52] U.S. Cl. .......................... 359/487; 359/485; 359/498; 359/583; 369/110

[58] Field of Search ....................... 359/583, 498, 359/499, 487, 485, 495, 500, 483, 494; 369/110

[56] References Cited

U.S. PATENT DOCUMENTS

| | | | |
|---|---|---|---|
| 4,721,368 | 1/1988 | Deguchi et al. | 369/110 |
| 4,730,297 | 3/1988 | Ishibashi et al. | 369/110 |
| 4,733,926 | 3/1988 | Title | 359/352 |
| 4,896,952 | 1/1990 | Rosenbluth | 359/638 |
| 4,966,438 | 10/1990 | Mouchart et al. | 359/583 |
| 4,974,219 | 11/1990 | Korth | 359/483 |
| 5,249,171 | 9/1993 | Matsubayashi et al. | 369/110 |
| 5,307,335 | 4/1994 | Komiya | 369/110 |
| 5,579,159 | 11/1996 | Ito | 359/498 |

FOREIGN PATENT DOCUMENTS

| | | | |
|---|---|---|---|
| 0336334 | 10/1989 | European Pat. Off. | G02B 27/28 |
| 0264917 | 3/1990 | Japan | G11B 7/08 |

Primary Examiner—Ricky D. Shafer
Assistant Examiner—John Juba, Jr.
Attorney, Agent, or Firm—Norman N. Spain

[57] ABSTRACT

A polarizing beam splitter for splitting a non-collimated light beam of a given wave length into two sub-beams, each of a different state of polarization, has a substrate provided with a polarizing stack of thin layers and a compensating means for compensating retardation of the light beam occurred in passing through the polarizing stack.

30 Claims, 11 Drawing Sheets

POLARIZING BEAM SPLITTER AND MAGNETO-OPTIC READING DEVICE USING THE SAME

This is a continuation of application Ser. No. 08/387,756, now abandoned, which is a National Stage application of PCT/I894,00170 filed on Jun. 23, 1994.

BACKGROUND OF THE INVENTION

The invention relates to a polarizing beam splitter for splitting an incident non-collimated light beam having a given wavelength into two sub-beams having mutually different states of polarization, which polarizing beam splitter has a substrate provided with a polarizing stack of thin layers. The invention also relates to a magneto-optic reading device provided with such a beam splitter.

Polarizing beam splitters are suitable, inter alia for splitting an incident light beam into two sub-beams which are mutually perpendicularly polarized. Special polarizing beam splitters referred to as partially polarizing beam splitters (PPBS) split an incident light beam into two sub-beams each having a desired proportion of the quantity of light in each of the two perpendicular directions of polarization.

A polarizing beam splitter of the type described in the opening paragraph is known from European Patent Application no. 0 336 334. This beam splitter comprises a polarizing stack of thin layers alternately having a high and a low refractive index. The first and the last layer of the stack are thinner than the intermediate layers in order to realise a correct beam splitting ratio for light beams which are incident at angles deviating from the angle of incidence for which the beam splitter has been designed. Such a beam splitter may be positioned directly in a diverging light beam as emitted by a semiconductor diode laser. This eliminates the necessity of positioning a lens in front of the beam splitter for collimating the beam and leads to a more compact optical arrangement.

The use of a polarizing beam splitter as a beam separator in a magneto-optic reading device is known, inter alia from Japanese Patent Application no. 2-64917 (A). In this device a diverging light beam having a first direction of polarization generated by a diode laser is incident through the beam splitter on a lens system which focuses the beam on an information storage medium. The state of polarization of the beam reflected by the medium is modulated by the information stored in the medium so that this beam does not only comprise a reasonably large quantity of light having said first direction of polarization but also a small, varying quantity of light having a second direction of polarization perpendicular to the first direction. The lens system converges the reflected beam. The beam splitter reflects a part of the beam reflected by the medium towards a detection system, which converts the modulation of the beam into an electric detection signal representing the information which has been read. The beam splitter reflects all the light of the second direction of polarization and a part of the light of the first direction of polarization, so that the detected signal is amplified. However, it appears that the use of the beam splitter known from said European Patent Application leads to a non-optimal detection signal in the reading device.

SUMMARY OF THE INVENTION

It is an object of the invention to provide a polarizing beam splitter with which an enhanced detection signal can be obtained.

According to the invention this object is achieved with a polarizing beam splitter as described in the opening paragraph and characterized in that the polarizing beam splitter comprises compensating means for compensating retardation incurred by the light beam in passing the polarizing stack.

The inadequate quality of the detection signal in the reading device provided with the known beam splitter appears to be the result of a phase difference, caused by the polarizing stack of this beam splitter, at the area of the detection system between the light of the first direction of polarization and the light of the second direction of polarization, in other words, a retardation which is unequal to zero. The retardation is dependent on the angle of incidence of the light on the polarizing stack. The beam splitter according to the invention solves this problem by arranging compensating means in the beam splitter, which means introduces a retardation in the non-collimated beam of light with a sign opposite to that of the retardation introduced by the polarizing stack. The retardation introduced by the combination of the polarizing stack and the compensating means can then be made smaller than a few degrees over a large range of angles of incidence. The ratio of the quantity of light in a sub-beam of the first and the second direction of polarization is determined by the choice of the refractive indices of the thin layers and of the substrate of the beam splitter. Use of a beam splitter according to the invention in a magneto-optic reading device leads to an enhanced quality of the detection signal.

In a preferred embodiment the compensating means comprise a compensating stack of thin layers adjacent to the polarizing stack. The distribution of the two functions of polarizing and compensating over two separate stacks, i.e. a polarizing stack and a compensating stack, allows a great freedom of design. Each stack can be designed such as to perform its function in an optimum way.

The compensation of the retardation can be improved and the construction of the compensating stack simplified when the polarizing beam splitter comprises a further compensating stack of thin layers adjacent to the polarizing stack. In this embodiment of the polarizing beam splitter the polarizing stack has a compensating stack on both sides.

In a preferred embodiment of the beam splitter according to the invention the polarizing stack comprises a plurality of successive layers alternately having a first refractive index $n_w$ and a second refractive index $n_h$, the value of $n_w$ being lower than the value of $n_h$. This polarizing stack can be designed for each desired polarization splitting ratio and can be easily manufactured.

The embodiments of the one or two compensating stacks of the beam splitter according to the invention can be divided in two classes. The compensating stack of the first class comprises a series of three successive layers having refractive indices $n_1$, $n_2$ and $n_3$, respectively, complying with the relation $n_3 < n_2 < n_1$. The layer of the series with the lowest refractive index should preferably face the polarizing stack for proper compensation. The retardation of a beam splitter with a compensating stack of the first class is rather insensitive to changes in the wavelength.

In the compensating stack of the first class the refractive indices of the layers preferably comply with the relations $n_w$ is equal to $n_3$, and $n_h$ is equal to one of the two values $n_1$ and $n_2$. A first embodiment of the combined stack comprising the polarizing stack and the compensating stack according to the invention therefore comprises layers having refractive indices: ... $n_1$, $n_2$, $n_3$, $n_1$, $n_3$, $n_1$, $n_3$ ... ; i.e. a succession of layers having a high and a low refractive index, and between two of these layers having a high and a low refractive index an extra layer having a refractive index which is in between said two indices. A second embodiment of the combined stack comprises layers having refractive indices: . . . $n_1$, $n_2$, $n_3$, $n_2$, $n_3$, $n_2$, $n_3$ . . . ; i.e. a succession of layers having a high and a low refractive index, with an extra layer having a refractive index which is higher than the high refractive index. Such stacks only comprise thin layers of three different materials and can therefore be readily made.

In a third embodiment of the compensating stack of the first class, which can also be readily made, the refractive indices of the layers comply with the relations $n_w$ is equal to $n_2$, and $n_h$ is equal to $n_1$. The layers then have the following refractive indices: . . . $n_1$, $n_2$, $n_3$, $n_1$, $n_2$, $n_1$, $n_2$ . . . , etc., i.e. a succession of layers having a high and a low refractive index, with an extra layer having a refractive index which is lower than the low refractive index. The retardation of the combined stack can be minimized by proper selection of the refractive index used in the compensating stack which is not equal to $n_w$ or $n_h$.

A satisfactory polarizing effect of the beam splitter is obtained if the optical thickness of each layer of the polarizing stack and of the compensating stack of the first class is equal to a quarter wavelength of the light beam. When the light beam diverges or converges, the optical thickness is designed for the central ray of the beam. Although other layer thicknesses are alternatively possible, an equal optical thickness of all layers has the advantage of simplicity of manufacture.

The compensating stack of the second class according to the invention comprises at least one layer having an optical thickness equal to a multiple of half wavelengths of the light beam. The layer, having a thickness of one, two or more times half a wavelength, has no effect on the retardation of the light beam at the angle of incidence for which the combined stack is designed. At other angles of incidence, however, the layer introduces retardation with a sign opposite to the sign of the retardation introduced by the polarizing stack. The retardation of the layer increases with increasing thickness of the layer. Hence, the compensation of the retardation of the polarizing stack can be adjusted by adjusting the thickness of the layer in steps of half a wavelength. A higher refractive index of the layer reduces the thickness required for the compensation.

When the refractive index of the at least one layer in the compensating stack of the second class is equal to one of the values $n_w$ and $n_h$ as used for the polarizing stack, only two different refractive indices are required for the manufacture of the stacks, thereby simplifying the manufacture of the combined stack.

According to the invention, a magneto-optic reading device for reading information stored on a magneto-optic record carrier is preferably provided with a radiation source supplying a radiation beam, a polarizing beam splitter according to the invention, which is arranged in the path of the radiation beam between the radiation source and the record carrier and in the path of the radiation beam reflected by the record carrier for separating the reflected radiation beam from the radiation beam supplied by the radiation source, and a detection system arranged in the path of the reflected radiation beam behind the beam splitter for deriving an information signal from this beam.

It is to be noted that U.S. Pat. No. 4,733,926 discloses a polarizing beam splitter in which a polarizing stack comprises series of four successive layers with refractive indices $n_2$, $n_1$, $n_2$ and $n_3$, respectively, and $n_3 < n_2 < n_1$. The first three layers of a series with refractive indices $n_2$, $n_1$, $n_2$ constitute a so-called Herpin triad, which operates as an equivalent layer with a refractive index different from $n_1$ and $n_2$. The Herpin triad makes it possible to create an equivalent layer with a refractive index which cannot be obtained with a single available material. The series of four layers operates as two successive layers, i.e. the equivalent layer and the layer with refractive index $n_3$, as is customary in a polarizing stack. Hence, the three successive layers with refractive indices $n_1$, $n_2$ and $n_3$ constitute an incidental sequence of layers arising from the use of the Herpin triad. The three successive layers are not adjacent to the polarizing stack but are part of the polarizing stack, and do not reduce the retardation of the polarizing stack. Moreover, the optical thickness of each of the layers in the Herpin triad is not equal to a quarter wavelength.

It is further to be noted that U.S. Pat. No. 4,431,258 discloses a beam splitter which is provided with a stack of a series of three successive thin layers having increasing refractive indices. However, this beam splitter is a non-polarizing beam splitter in which several series of three successive layers have the function of increasing the reflection of one of the two perpendicularly polarized components of the incident light so that the two components acquire the same reflection. In contrast, the beam splitter according to the invention is a polarizing beam splitter, where a wanted unequal reflection of the two components is obtained by the alternation of layers having a high and a low refractive index, while the series of three successive layers reduces the phase difference between the two polarization components in a sub-beam.

BRIEF DESCRIPTION OF THE DRAWING

In the drawing.

FIG. 2a shows the reflection and transmission coefficients for the s-polarized light, FIG. 2b shows the reflection and transmission coefficients for the p-polarized light and FIG. 2c shows the phase difference between the s-polarized light and the p-polarized light in transmission;

DETAILED DESCRIPTION OF THE PREFERRED EMBODIMENTS

Figure 1:
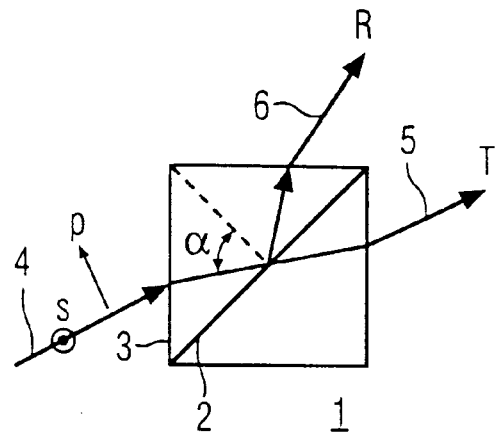
FIG. 1 shows a conventional polarizing beam splitter.

The invention will now be described in greater detail with reference to the figures of the drawing.

FIG. 1 shows a conventional polarizing beam splitter 1 in the form of a cube having a splitting face 2 at an angle of 45° to an entrance face 3. In the Figure the plane of incidence coincides with the plane of the drawing. A light beam 4 incident on the entrance face can be considered to be composed of a component polarized in the plane of incidence (direction p of polarization in the Figure) and a component polarized in a direction perpendicular to the plane of incidence (direction s of polarization). The beam splitter splits the beam 4 into a transmitted sub-beam 5 and a reflected sub-beam 6. The beam splitter is designed for passing in transmission, i.e. from the incident beam 4 to the sub-beam 5, as much as possible of the incident light of the p polarization (a p transmission coefficient of 1) and 10% of the incident light of the s polarization (an s transmission coefficient of 0.1). To this end a polarizing stack of five thin layers is provided on the splitting face, each layer having a thickness of a quarter of the wavelength for which the beam splitter has been designed. The refractive indices of the successive layers are: 1.95, 1.37, 1.95, 1.37, 1.95, while the refractive index of the cube material is 1.61. The optical thickness of each layer is equal to a quarter of the design wavelength at an angle of incidence α of 45°. The design wavelength is 785 nm.

Figure 2A:
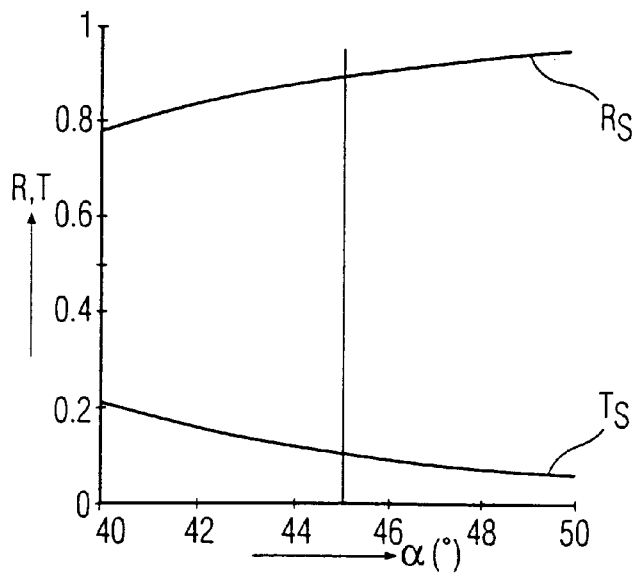
FIGS. 2a, 2b and 2c are graphic representations of the optical properties of a conventional beam splitter as a function of the angle of incidence, viz.
Figure 2B:
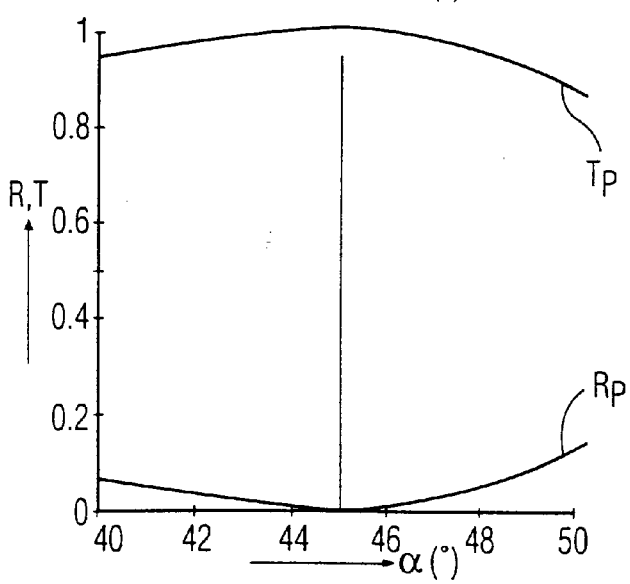
Figure 2C:
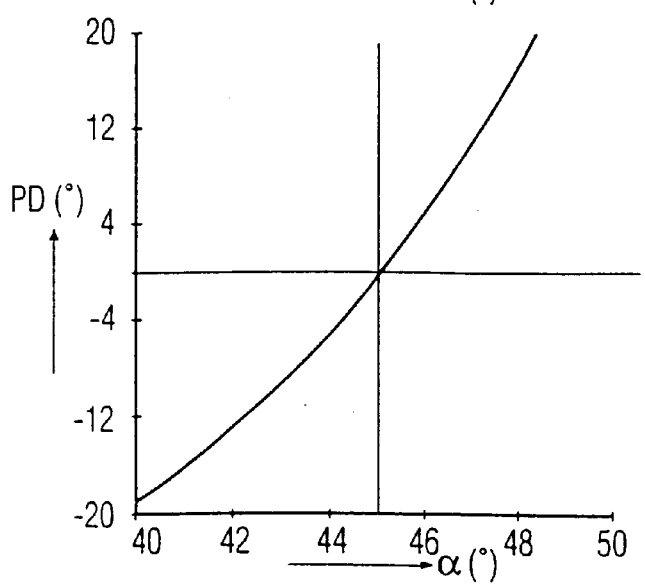

FIG. 2 shows the optical properties of the conventional beam splitter 1 as a function of the angle of incidence α of a parallel light beam 4 having a wavelength of 785 nm. FIG. 2a shows the reflection coefficient $R_s$ and the transmission coefficient $T_s$ for the s-polarized component of the incident beam. FIG. 2b shows the reflection coefficient $R_p$ and the transmission coefficient $T_p$ for the p-polarized component of the incident beam. At angles of incidence which differ from 45°, the transmissions $T_s$ and $T_p$ deviate from the design values 0.1 and 1, respectively. FIG. 2c shows the phase difference PD between the s-polarized component and the p-polarized component in the transmitted sub-beam 5 and caused by the passage through the beam splitter. This parameter which is generally not specified for the conventional beam splitters should be zero so as not to disturb the phase relation between the polarization components in the transmitted light beam. At an angle of incidence of 45° the phase difference is indeed zero, but for a slightly larger or smaller angle of incidence the phase difference increases or decreases rapidly. For given applications, for example in a magneto-optic reading device, the phase difference should be smaller than 10° for all angles of incidence in a range of approximately 10° around 45°. The conventional beam splitter associated with FIG. 2c has a phase difference ranging between −20° and more than +20° and is consequently unsuitable for such applications.

Since the beam splitter according to the invention is provided with a compensating stack of layers, this beam splitter does comply with said retardation condition. In a first class of embodiments according to the invention the compensating stack comprises three successive layers with a staircase profile for the refractive index.

Figure 3:
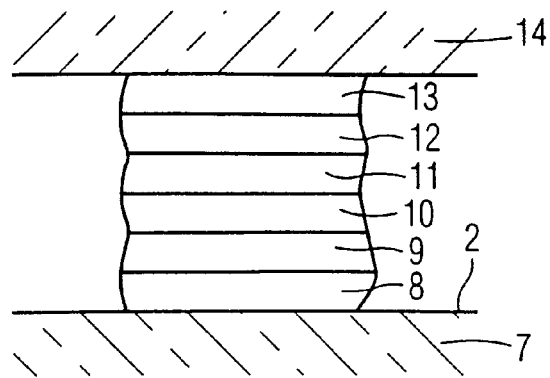
FIG. 3 shows a first embodiment of a combined stack according to the invention having a compensating stack of the first class.

A first embodiment of the beam splitter of the first class comprises a cube 1 having a splitting face 2 as shown in FIG. 1. The combined stack comprising the polarizing stack and the compensating stack according to the invention, a cross-section of which is shown in FIG. 3, is provided on the splitting face 2 of the cube, with the refractive index of the underlying substrate 7 being equal to 1.61. The six thin layers 8 to 13 of the combined stack each have a thickness of a quarter wavelength at an angle of incidence of 45° to the normal on the splitting face. The design wavelength is 785 nm. The refractive indices of the layers 8 to 13 are 2.35, 1.37, 2.35, 1.37, 1.77 and 2.35. The first-mentioned three layers constitute the polarizing stack. The last-mentioned three layers in this stack, having an increasing refractive index, constitute the compensating stack according to the invention. Another part of the cube, substrate 14, having a refractive index of 1.61 is secured to the stack by means of an adhesive preferably having the same refractive index as the substrate. The substrates 7 and 14 are made of the optical glass SK16 from the Schott catalog, the thin layers are made of $Na_3AlF_6$ (cryolite, n=1.37), $PbF_2$ (n=1.77) and ZnS (n=2.35). The refractive indices are chosen to render the transmission of the p component as large as possible and to render the transmission of the s component to be 15%. Other values of the reflection and transmission of the beam splitter may be obtained by different choices of the refractive indices of the thin layers. The light may enter the stack both from the side of substrate 7 and from the side of substrate 14.

Figure 4A:
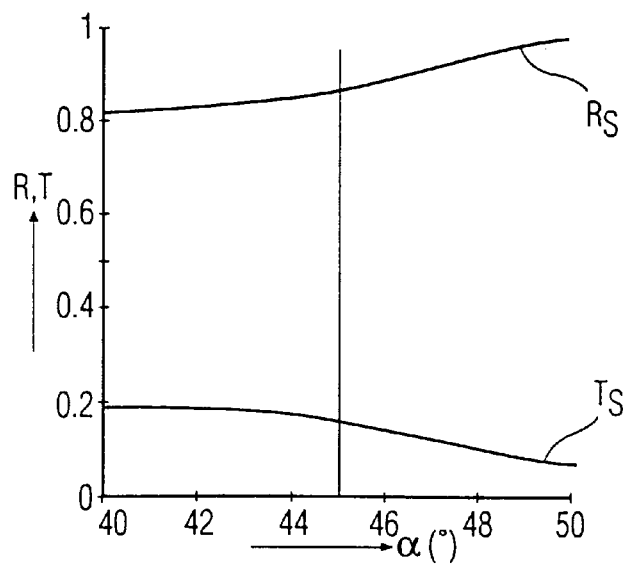
FIGS. 4a, 4b and 4c are graphic representations similar to those in FIGS. 2a, 2b and 2c, but this time for the stack shown in FIG. 3.
Figure 4B:
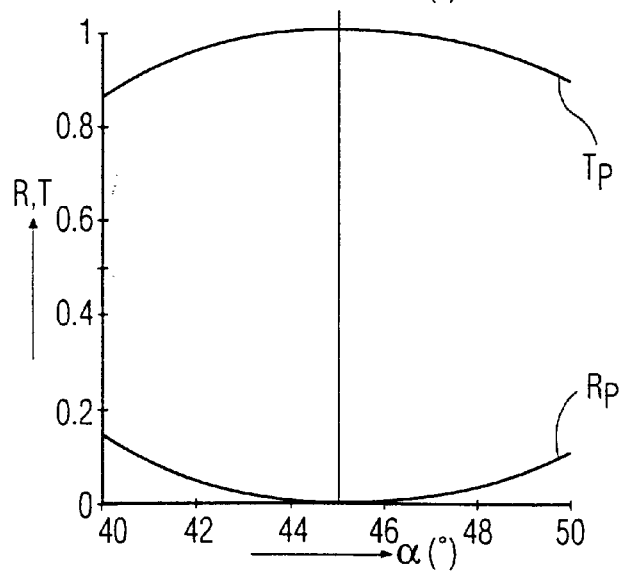
Figure 4C:
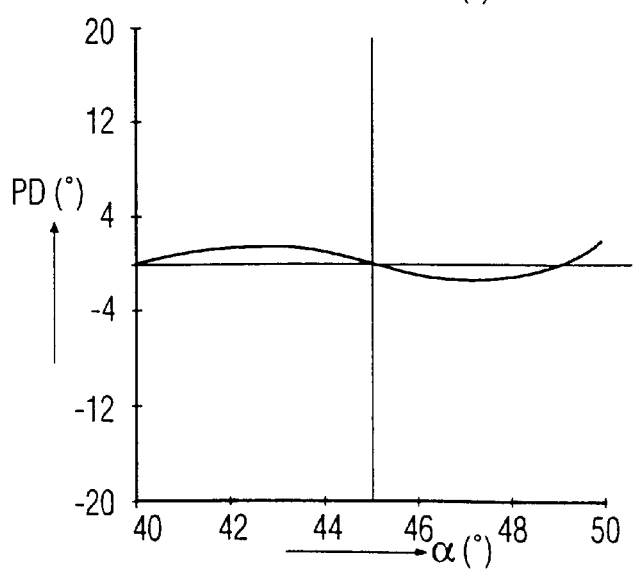

FIGS. 4a and b show the variation of the reflection and transmission coefficients for the s and p-polarization components for the first embodiment of the beam splitter according to the invention. The retardation between these components of the transmitted beam introduced by the beam splitter and shown in FIG. 4c is smaller than 2° throughout the range of angles of incidence from 40° to 50°. The maximum value of the undulation in the retardation curve is determined by the value of the refractive index of layer 12, i.e. the middle layer in the compensating stack. The value should be between the refractive indices of the two adjacent layers. The small retardation of the beam splitter renders it very suitable for use in a magneto-optic reading device.

Figure 5:
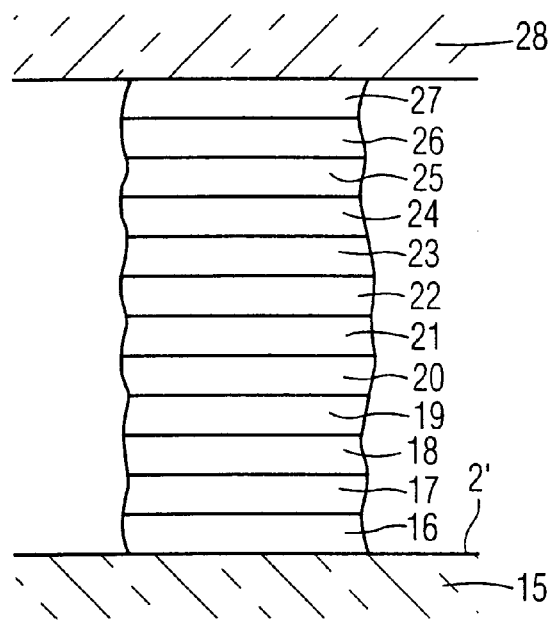
FIG. 5 shows a second embodiment of a combined stack according to the invention having a compensating stack of the first class.

A second embodiment of the beam splitter of the first class also comprises a cube having a splitting face 2' as shown in FIG. 1. The combined stack according to the invention, a cross-section of which is shown in FIG. 5, is provided on the splitting face 2' of the cube, with the refractive index of the underlying substrate 15 being 1.60. The twelve thin layers 16 to 27 of this stack each have an optical thickness of a quarter wavelength at an angle of incidence of 45° to the normal on the splitting face. The design wavelength is 790 nm. The refractive indices of the layers 16 and 27 are 1.46, 2.30, 2.00, 1.46, 2.30, 1.46, 2.30, 1.46, 2.30, 1.46, 2.30 and 1.46, respectively. The three layers 17, 18 and 19 constitute the compensating stack according to the invention. Another part of the cube, substrate 28, having a refractive index of 1.60 is secured to the stack by means of an adhesive. The substrates 15 and 28 are made of the optical glass SK7 from the Schott catalog, the thin layers are made of $SiO_2$ (n=1.46), $ZrO$, (n=2.00) and $TiO_2$ (n=2.30). The refractive indices are chosen to render the reflection of the p component to be 20% and the reflection of the s component to be 100%.

Figure 6A:
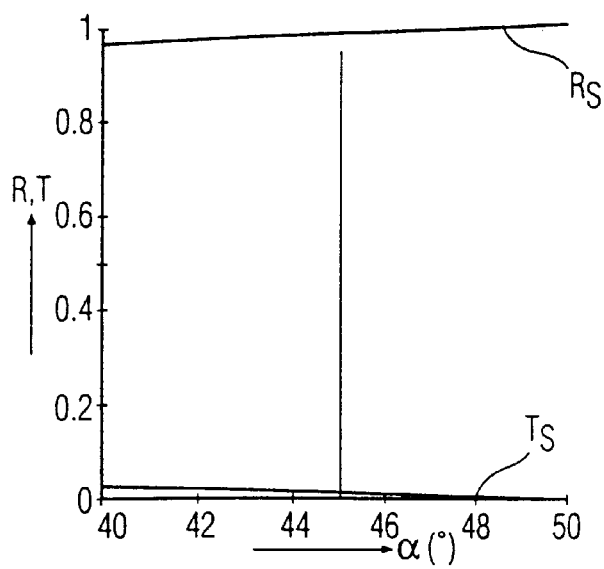
FIGS. 6a and 6b are graphic representations similar to those in FIGS. 2a and 2b, but this time for the stack shown in FIG. 5.
Figure 6B:
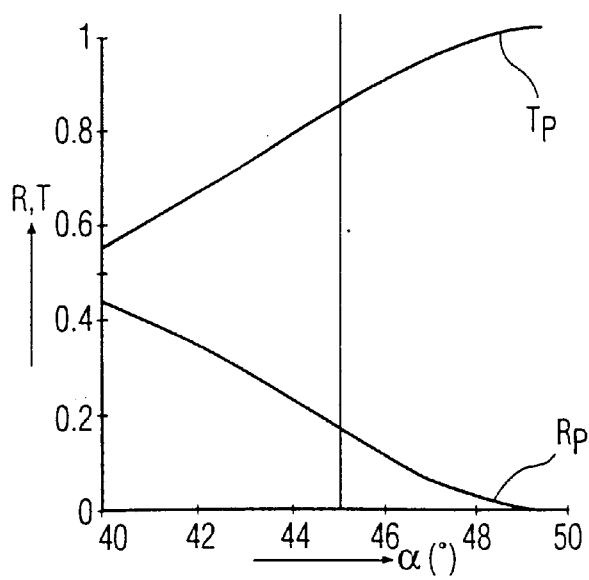
Figure 6C:
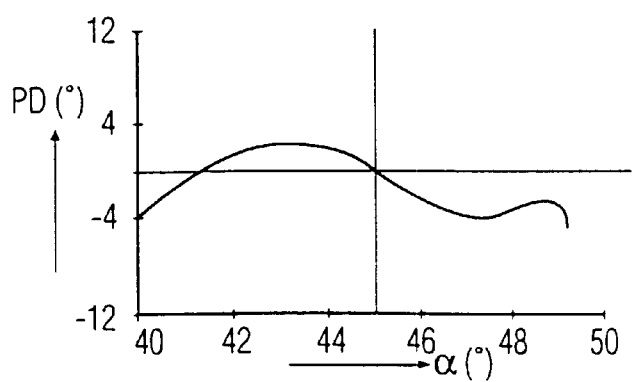
FIG. 6c shows the phase difference between the s-polarized light and the p-polarized light in reflection for the stack shown in FIG. 5.

FIGS. 6*a* and *b* show the variation of the reflection and transmission coefficients for the s and p polarization for the second embodiment of the beam splitter according to the invention. The retardation of the beam splitter for the reflected beam, shown in FIG. 6*c*, is smaller than 4° in the range of the angle of incidence between 40° and 49°. The high reflection of the s component is also achieved by placing the low refractive index layer 16 against the high refractive index layer 17 of the compensating stack. The compensating stack according to the invention is preferably positioned at the beginning or the end of the combined stack, possibly with an additional single quarter-wavelength layer as a respective first or last layer such as, for example, layer 16. If the compensating stack is arranged in between the layers of the polarizing stack, Fabry-Perot effects will occur which will render the reflection and transmission coefficients considerably angle-dependent.

As is shown in FIG. 1, the light beam 4 entering through the entrance face 3 of the cube 1 is deflected towards the normal on said face because the cube is made of a material having a refractive index which is larger than that of the medium outside the cube. Consequently, the divergence of an incident beam will be smaller within the cube than outside it. By manufacturing the cube of a material having a relatively high refractive index, the divergence of the incident beam in the cube is reduced considerably, hence the range of angles of incidence α with which rays of the beam are incident on the stack of layers will be reduced as well. A divergence angle of 5° in air is reduced to 3° in a material having a refractive index of 1.7. This alleviates the requirements which are imposed on the angle dependence of the optical properties of the beam splitter.

Figure 7:
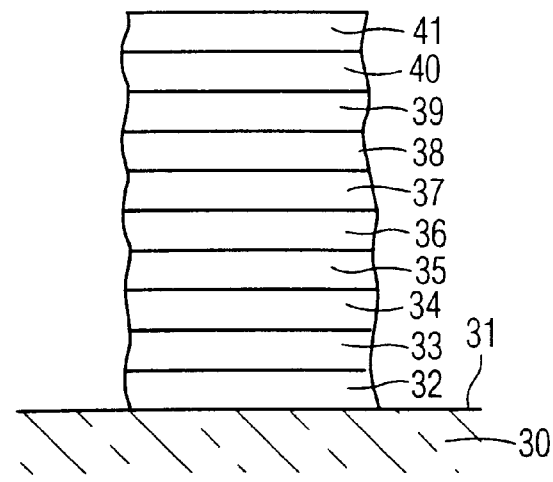
FIG. 7 shows an embodiment of a combined stack having a compensating stack of the first class on a planar plate.

A third embodiment of the beam splitter of the first class comprises a planar plate 30 as shown in FIG. 7. The combined stack is provided on a side 31 of the planar plate. The ten thin layers 32 to 41 of the stack, with layer 32 directly provided on side 31, each have an optical thickness of a quarter wavelength at an angle of incidence of 65° with respect to the normal on the side 31. The design wavelength is 790 nm. The refractive indices of the layers 32 to 41 are 2.00, 1.72, 1.46, 1.72, 1.46, 1.72, 1.46, 1.72, 1.46 and 2.00. The three layers 32, 33 and 34 constitute the compensating stack according to the invention. The planar plate 30 is made of amorphous quartz (n=1.46), the thin layers are made of $SiO_2$ (n=1.46), MgO (n=1.72) and $ZrO_2$ (n=2.00). The refractive indices are chosen to render the transmission of the p component as large as possible and to render the transmission of the s component to be 20%. The compensating stack is preferably arranged between the planar plate and the polarizing stack for a proper compensation.

Figure 8A:
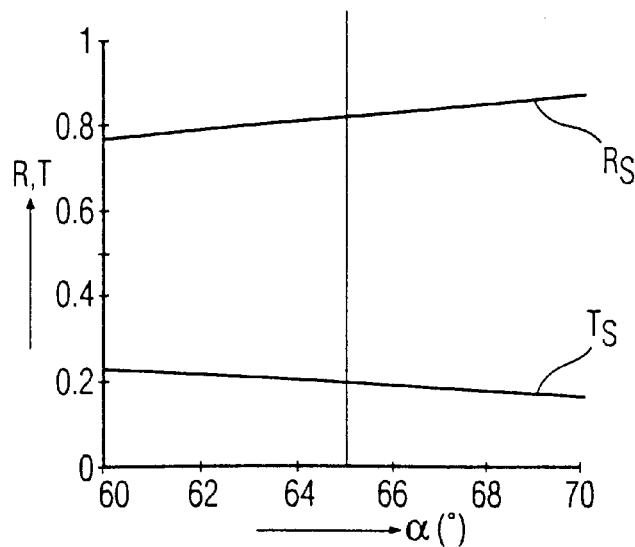
FIGS. 8a, 8b and 8c are graphic representations similar to those in FIGS. 2a, 2b and 2c, but this time for the stack shown in FIG. 7.
Figure 8B:
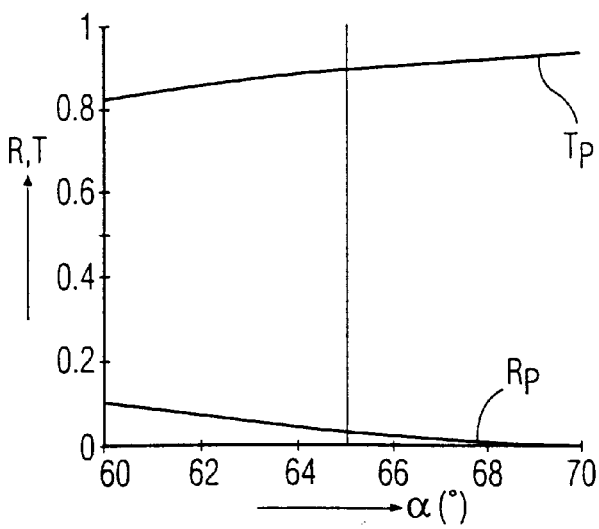
Figure 8C:
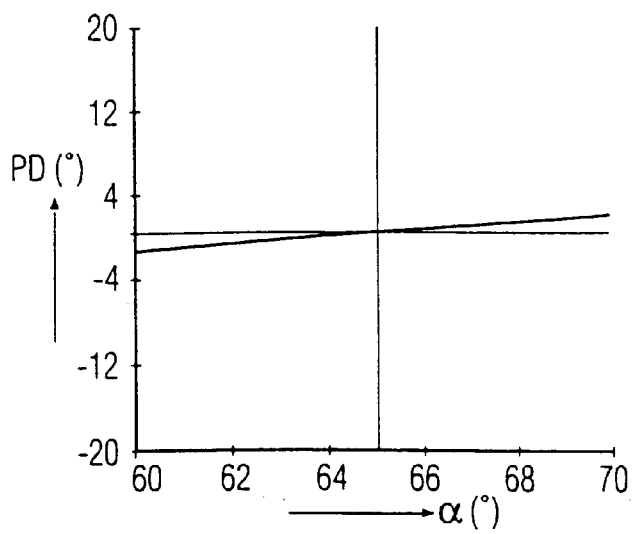

FIGS. 8*a* and *b* show the variation of the reflection and transmission coefficients for the s and p polarization for the third embodiment of the beam splitter shown in FIG. 7. Layer 41 yields an increase of $R_s$ without influencing the retardation. If layer 41 has a refractive index of 1.72, $R_s$ will be approximately 0.70, while $R_s$ will be approximately 0.80 if the layer has a refractive index of 2.00. The retardation introduced by the beam splitter between the p and s components of the transmitted beam as shown in FIG. 8*c* is smaller than 2° for angles of incidence in the range between 40° and 50°.

In a second class of embodiments of the beam splitter according to the invention the compensating stack comprises at least one layer having an optical thickness equal to a multiple of half wavelengths.

Figure 9:
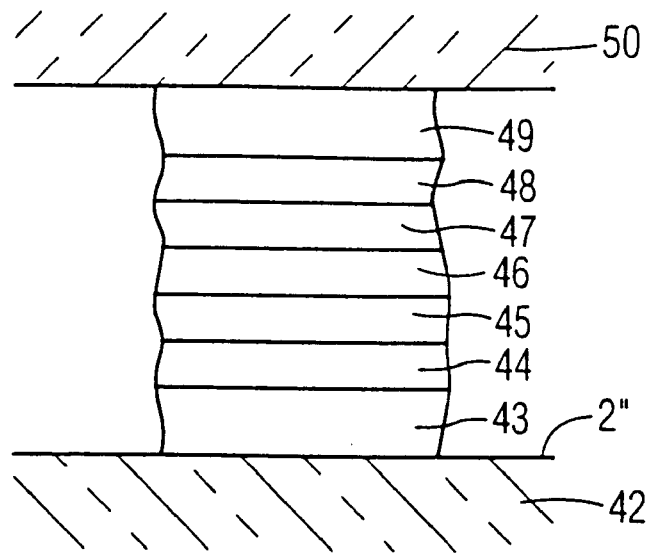
FIG. 9 shows a first embodiment of a combined stack according to the invention having a compensating stack of the second class.

A first embodiment of the beam splitter of the second class comprises a cube having a splitting face 2" as shown in FIG. 1. The combined stack according to the invention, a cross-section of which is shown in FIG. 9, is provided on the splitting face 2" of the cube, with the refractive index of the underlying substrate 42 being equal to 1.61. The combined stack comprises a polarizing stack and a compensating stack on both sides of the polarizing stack. The polarizing stack comprises five thin layers 44 to 48, each having a thickness of a quarter wavelength at an angle of incidence of 45° to the normal on the splitting face. The design wavelength is 790 nm. The refractive indices of the layers 44 to 48 are 1.47, 2.30, 1.47, 2.30 and 1.47, respectively. The first compensating stack comprises layer 43 having a thickness of one wavelength, the second compensating stack comprises layer 49 having a thickness of one and a half wavelength. The refractive indices of the layers 43 and 49 are both equal to 2.3. Another part of the cube, substrate 50, having a refractive index of 1.61 is secured to the stack by means of an adhesive preferably having the same refractive index as the substrate. The substrates 42 and 50 are made of the optical glass SK16 from the Schott catalog, the thin layers are made of $SiO_2$ (n=1.47) and $TiO_2$ (n=2.30).

Figure 10A:
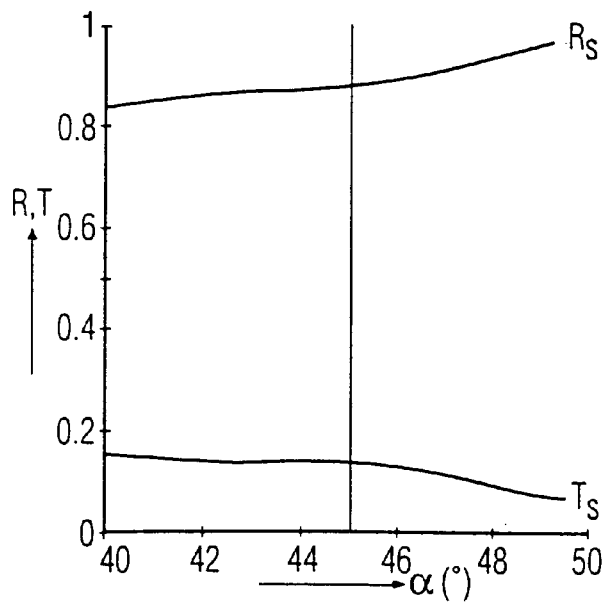
FIGS. 10a, 10b and 10c are graphic representations similar to those in FIGS. 2a, 2b and 2c, but this time for the stack shown in FIG. 9.
Figure 10B:
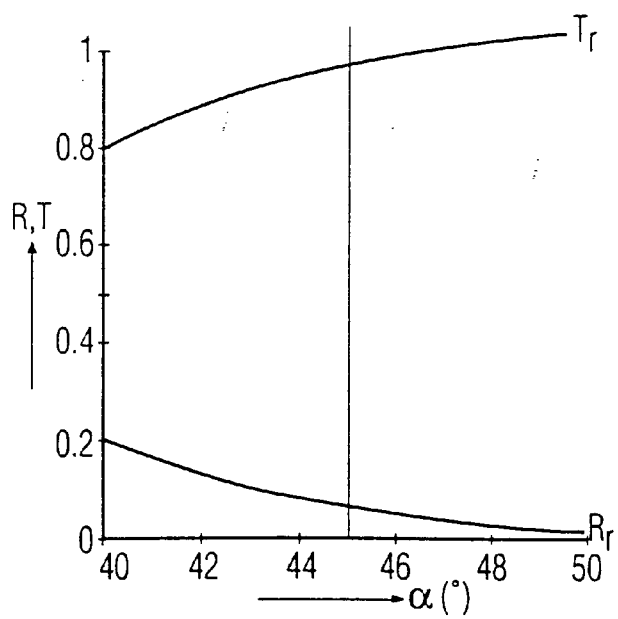
Figure 10C:
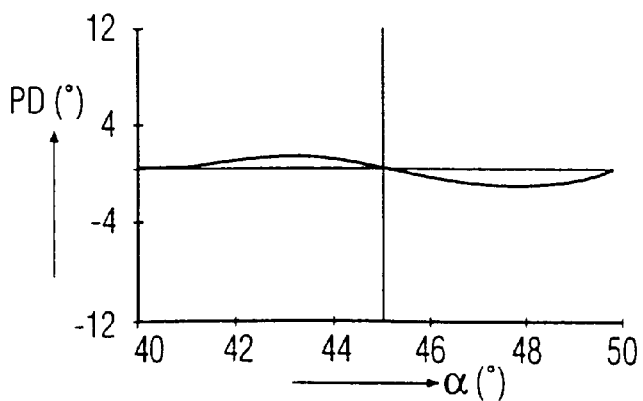

FIGS. 10*a* and *b* show the variation of the reflection and transmission coefficients for the s and p-polarization components for the first embodiment of the beam splitter according to the second class. The retardation between these components of the transmitted beam introduced by the beam splitter and shown in FIG. 10*c* is smaller than 1.5° throughout the range of angles of incidence from 40° to 50°. A comparably good compensation may be achieved by an embodiment in which the combined stack is provided with only one instead of two compensating stacks; the single compensating stack must have a layer with a thickness of four wavelengths to achieve the wanted low retardation. The embodiment shown in FIG. 9 has the advantage that the two separate layers 43 and 49 of one wavelength thickness and of one and a half wavelength thickness, respectively, are easier to make than a single layer of four wavelengths thickness. When the two layers 43 and 49 each have a thickness of half a wavelength, a reasonable retardation compensation will be achieved, although not as good as the compensation of the embodiment shown in FIG. 9. The refractive index of both layers 43 and 49 in the stack shown in FIG. 9 is equal to the 2.3, which is the high refractive index as used in the polarizing stack. When layers 43 and 49 have a refractive index equal to 1.47, which is the low refractive index used in the polarizing stack, the retardation of the polarizing stack can also be compensated, but a larger thickness of layers 43 and 49 is required to obtain the same degree of compensation as when using layers having the high refractive index. Retardation compensation is also possible with layers having a refractive index not equal to the high or low refractive index used in the polarizing stack.

A second embodiment of the beam splitter of the second class has a stack configuration comparable to the one shown in FIG. 9 with successive layers 43' to 49' between substrates 42' and 50'. The refractive indices of the components 42' to 50' are 1.7, 1.47, 2.30, 1.65, 2.30, 1.47, 2.30, 1.47 and 1.7 respectively. The thickness of each of the layers 44' to 48' forming a polarizing stack is a quarter wavelength; the thickness of each of the layers 43' and 49', each one forming a compensating stack, is half a wavelength. The substrates 42' and 50' are made of the optical glass SF1 from the Schott catalog, the thin layers are made of SiO$_2$ (n=1.47), SiO$_X$ (n=1.65) and TiO$_2$ (n=2.30). Layer 45' with a refractive index of 1.65 instead of the expected value of 1.47 changes the reflection and transmission coefficients of the combined beam stack while maintaining the low retardation.

Figure 11A:
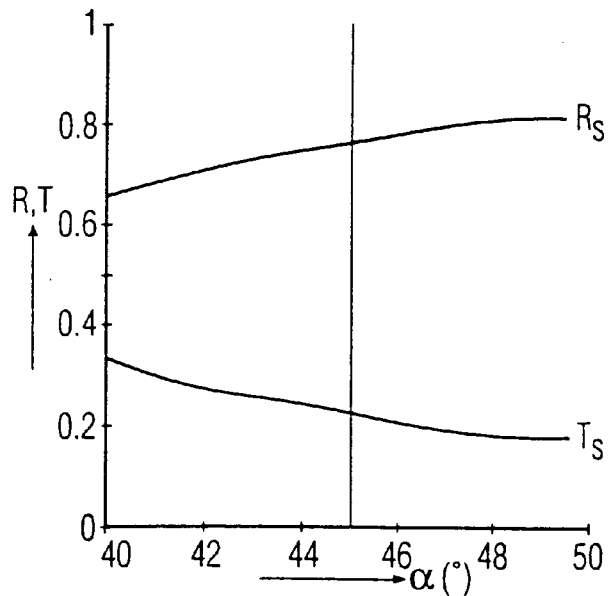
FIGS. 11a, 11b and 11c are graphic representations similar to those in FIGS. 2a, 2b and 2c, but this time for a second embodiment of a combined stack having a compensating stack of the second class.
Figure 11B:
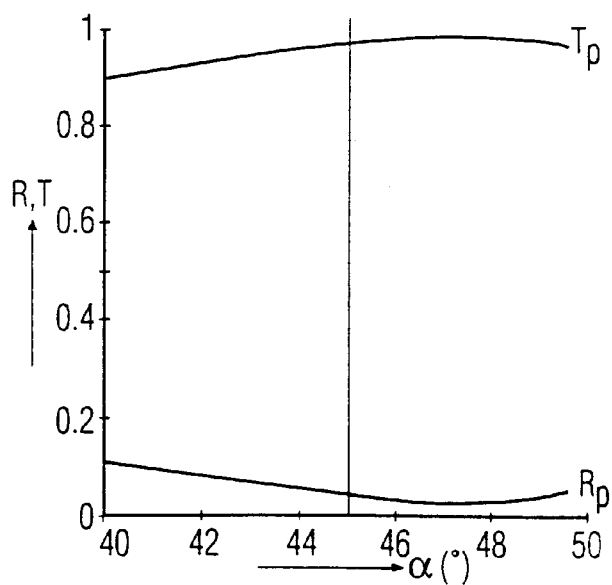
Figure 11C:
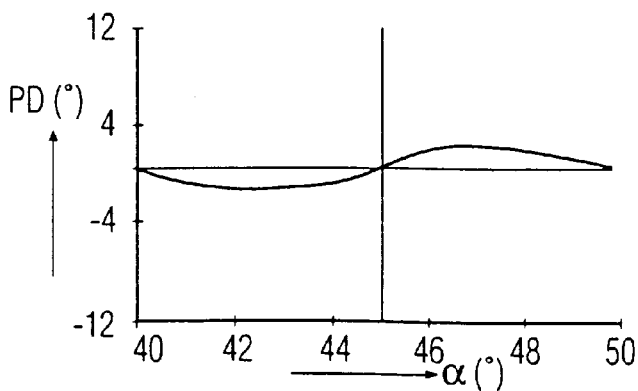

FIGS. 11a and b show the variation of the reflection and transmission coefficients for the s and p-polarization components for the second embodiment of the beam splitter according to the second class. The retardation between these components of the transmitted beam introduced by the beam splitter and shown in FIG. 11c is smaller than 2° throughout the range of angles of incidence from 40° to 50°. The deviation of the value of the refractive index of layer 45' from the value 1.47 allows the transmission of the s and p-polarization component to be equal to 20% and more than 95%, respectively.

A third embodiment of the beam splitter of the second class has a stack configuration comparable to the one shown in FIG. 9 with successive layers 43" to 49" between substrates 42" and 50". The refractive indices of the components 42" to 50" are 1.61, 2.30, 1.47, 2.30, 1.47, 2.30, 1.47, 2.0 and 1.61 respectively. The thickness of each of the layers 44" to 48" forming a polarizing stack is a quarter wavelength; the thickness of each of the layers 43" and 49", each one forming a compensating stack, is half a wavelength and two wavelengths, respectively. The substrates 42" and 50" are made of the optical glass SK16 from the Schott catalog, the thin layers are made of SiO$_2$ (n=1.47), ZrO$_2$ (n=2.00) and TiO$_2$ (n=2.30). Layer 49" serves the purpose of both a compensating stack and an intermediate layer for releasing tension in the combined stack.

Figure 12A:
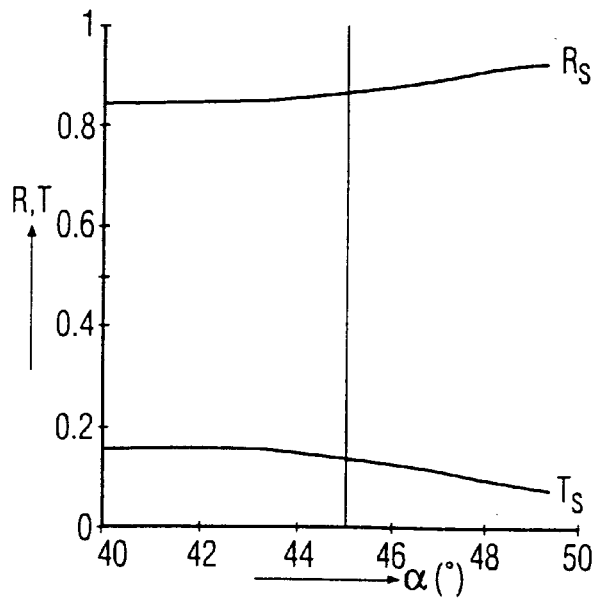
FIGS. 12a, 12b and 12c are graphic representations similar to those in FIGS. 2a, 2b and 2c, but this time for a third embodiment of a combined stack having a compensating stack of the second class.
Figure 12B:
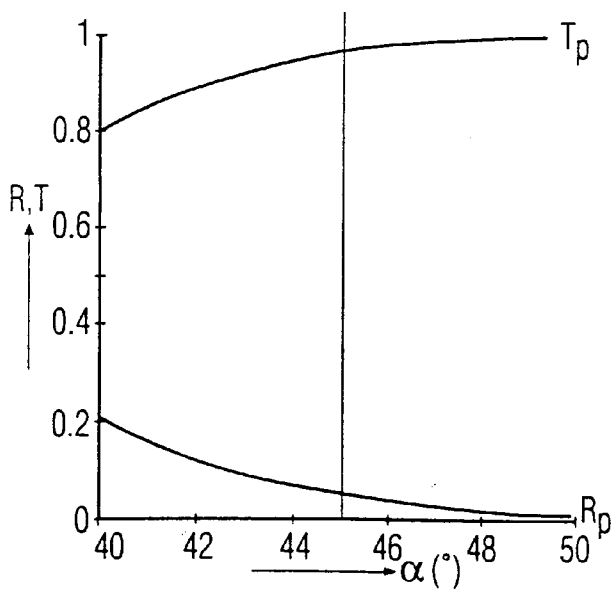
Figure 12C:
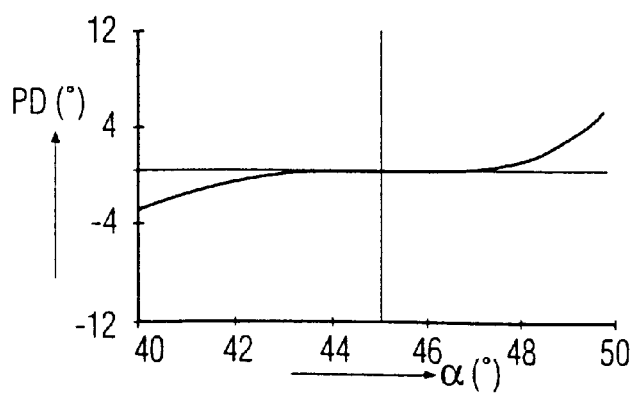

FIGS. 12a and b show the variation of the reflection and transmission coefficients for the s and p-polarization components for the second embodiment of the beam splitter according to the second class. The retardation between these components of the transmitted beam introduced by the beam splitter and shown in FIG. 12c is smaller than 5° throughout the range of angles of incidence from 40° to 50°. The low retardation is maintained when the thickness of layer 49" is changed by a multiple of half wavelengths.

Figure 13:
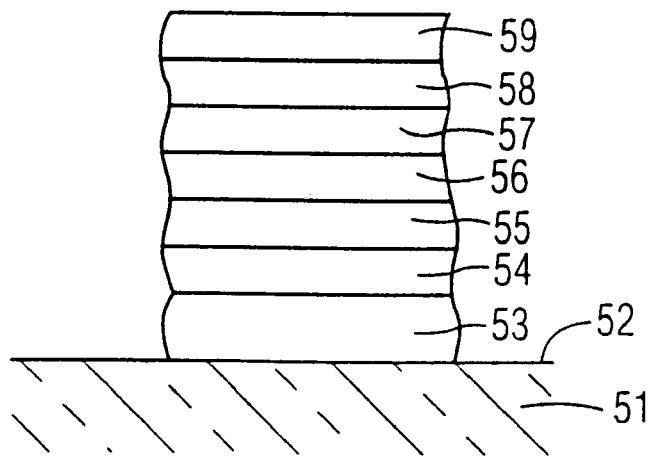
FIG. 13 shows a fourth embodiment of a combined stack according to the invention having a compensating stack of the second class on a planar plate.

A fourth embodiment of the beam splitter of the second class comprises a planar plate 51 as shown in FIG. 13. The combined stack is provided on one side 52 of the planar plate. The stack comprises seven thin layers. The first one, layer 53, forms a compensating stack and is directly provided on side 52. The following six layers 54 to 59 of the stack form a polarizing stack. The six layers each have an optical thickness of a quarter wavelength at an angle of incidence of 45° with respect to the normal on the side 31, whereas layer 53 has a thickness of three wavelengths. The design wavelength is 790 nm. The refractive indices of layers 53 to 59 are 2.30, 1.47, 2.30, 1.47, 2.30, 1.47 and 2.30. The planar plate 30 is made of the glass SK16 (n=1.46) from the Schott catalog, the thin layers are made of SiO$_2$ (n=1.47) and TiO$_2$ (n=2.30).

Figure 14A:
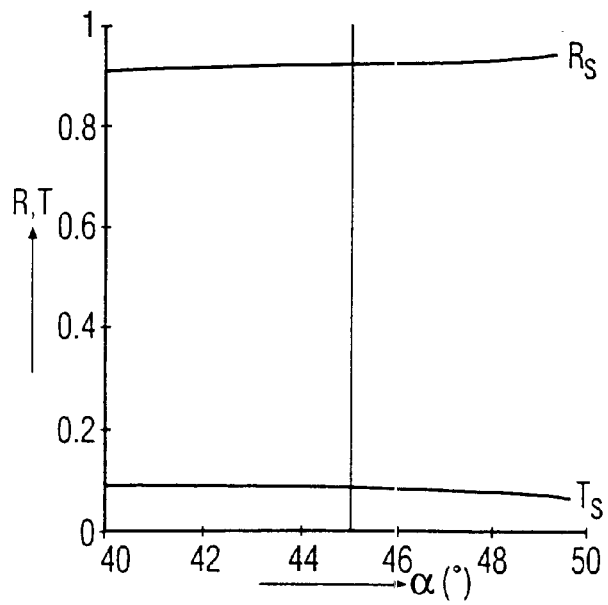
FIGS. 14a, 14b and 14c are graphic representations similar to those in FIGS. 2a, 2b and 2c, but this time for the stack shown in FIG. 13.
Figure 14B:
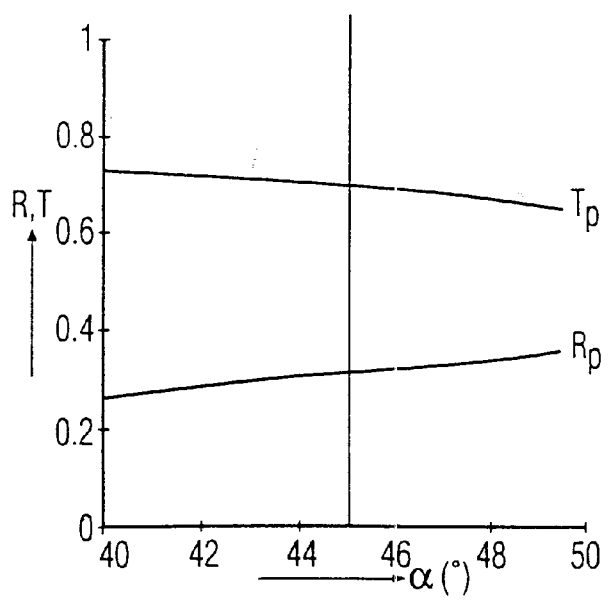
Figure 14C:
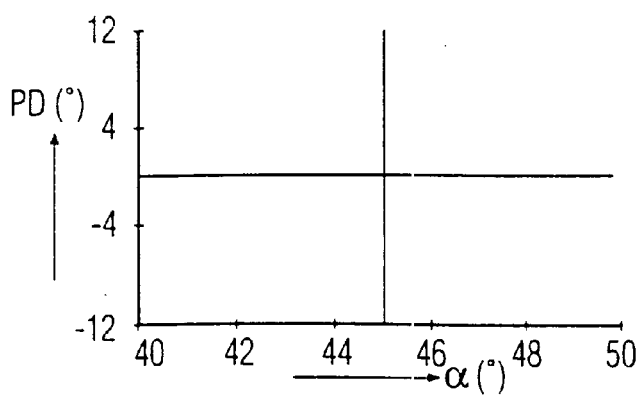

FIGS. 14a and b show the variation of the reflection and transmission coefficients for the s and p polarization for the third embodiment of the beam splitter according to the invention. The retardation introduced by the beam splitter between the p and s components of the transmitted beam as shown in FIG. 8c is substantially smaller than 0.2° for angles of incidence in the range between 40° and 50°. The compensating stack must be located on the side of the substrate to obtain a good compensation. When the layer of the compensating stack has a refractive index equal to 1.47, the thickness of the layer must be five wavelengths in order to achieve the same compensation as with the layer having a refractive index 2.30 and a thickness of three wavelengths.

Figure 15:
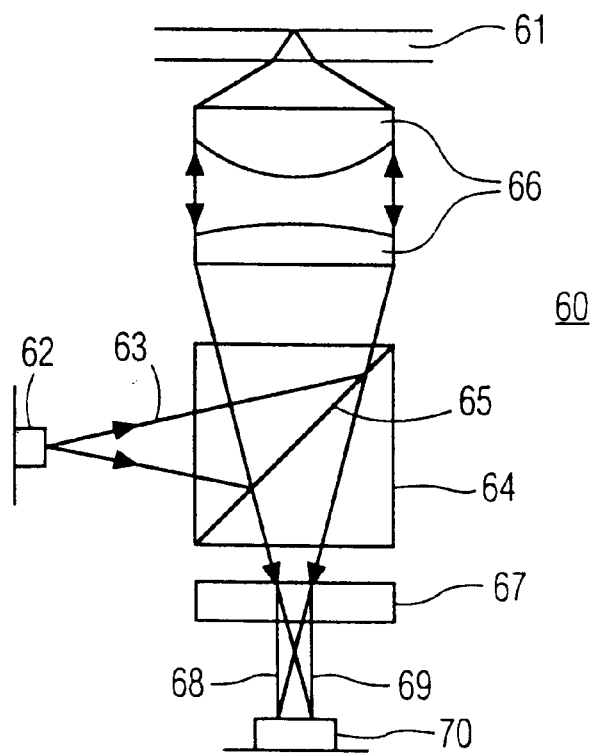
FIG. 15 shows a magneto-optic reading device provided with a beam splitter according to the invention.

FIG. 15 shows a magneto-optic reading device 60 with an associated record carrier 61. A radiation source 62, for example a diode laser generates a diverging radiation beam 63, which is polarized in a direction perpendicular to the plane of the drawing, i.e. the s direction. The radiation beam is subsequently incident on a polarizing beam splitter 64 according to the invention. The combined stack of thin layers on the splitting face 65 of the beam splitter has the same structure as the stack shown in FIG. 3. According to FIG. 4a the beam splitter reflects 84% of the incident radiation beam towards an objective system 66 which subsequently focuses the beam on the record carrier 61. The radiation beam reflected from the record carrier is modulated by the information stored on the record carrier. The modulation is in the form of a small angular rotation of the direction of polarization of the beam, dependent on the information which has been read. The rotation becomes manifest as a p-polarized component in the mainly s-polarized reflected beam. The reflected beam is partially transmitted by the beam splitter 64 with a transmission of almost 100% for the p component and a transmission of 16% for the s component (see FIGS. 4a and b). The chosen ratio between the transmission of the p and s components results in the polarization rotation due to the information on the record carrier being amplified so that this rotation and hence the information signal can be better detected. The beam transmitted by beam splitter 64 is incident on a subsequent beam splitter 67, for example a Wollaston prism which splits the incident beam into two mutually perpendicularly polarized beams 68, 69 having different directions of propagation. These two beams are each detected by separate elements of a detection system 70 and converted into electric signals. An information signal representing the information which has been read can be derived from the electric signals.

For a satisfactory detection it is necessary that the p and s components, transmitted by the beam splitter 64, of the reflected beam are not subject to a large mutual phase difference or retardation in the beam splitter. In the beam splitter according to the invention this is realised by a special stack of thin layers on the splitting face of the beam splitter, so that even a converging beam, as in the reading device shown, experiences only a small retardation.

The embodiments of the beam splitter shown in FIGS. 5, 7, 9 and 13 are also usable in a magneto-optic reading device. The embodiments shown in FIGS. 5 and 13 should be used in a device in which the beam splitter reflects the beam from the record carrier towards the detection system. The embodiments shown in FIGS. 7 and 9 should be used in a device in which the beam splitter transmits the beam from the record carrier towards the detection system.

The beam splitter according to the invention can be used to advantage in all applications in which a polarizing beam splitter is placed in a converging or diverging beam, and in which no large phase differences between the p and s components should occur in the reflected or transmitted beam. Such applications are, for example polarization measuring apparatus and polarization detection means used in optical telecommunication.

We claim:

1. A polarizing beam splitter having a substrate provided with a polarizing stack of layers for splitting a non-collimated light beam having a given wavelength and incident thereupon into two sub-beams having mutually different states of polarization, at least one of the sub-beams having two components of mutually orthogonal polarization, each component having a phase, characterized in that said polarizing beam splitter comprises means for compensating a difference between said phases.

2. A polarizing beam splitter as claimed in claim 1, characterized in that the compensating means comprise a compensating stack of thin layers adjacent to the polarizing stack.

3. A polarizing beam splitter as claimed in claim 2, characterized in that the polarizing beam splitter comprises a further compensating stack of thin layers adjacent to the polarizing stack.

4. A polarizing beam splitter as claimed in claim 3, characterized in that the polarizing stack comprises a plurality of successive layers alternately having a first refractive index $n_w$ and a second refractive index $n_h$, the value of $n_w$ being lower than the value of $n_h$.

5. A polarizing beam splitter as claimed in claim 3, characterized in that each compensating stack comprises a series of three successive layers having refractive indices $n_1$, $n_2$ and $n_3$, respectively, complying with the relation $n_3 < n_2 < n_1$.

6. A polarizing beam splitter as claimed in claim 3, characterized in that in at least one of the compensating stacks comprises at least one layer having an optical thickness equal to a multiple of half wavelengths of the light beam.

7. A polarizing beam splitter as claimed in claim 3, characterized in that the beam splitter has a further substrate such that the polarizing stack is arranged between the two substrates.

8. A polarizing beam splitter as claimed in claim 2, characterized in that the polarizing stack comprises a plurality of successive layers alternately having a first refractive index $n_w$ and a second refractive index $n_h$, the value of $n_w$ being lower than the value of $n_h$.

9. A polarizing beam splitter as claimed in claim 8, characterized in that the compensating stack comprises a series of three successive layers having refractive indices $n_1$, $n_2$ and $n_3$, respectively, complying with the relation $n_3 < n_2 < n_1$.

10. A polarizing beam splitter as claimed in claim 9, characterized in that the refractive indices of the layers comply with the relations $n_w$ is equal to $n_3$, and $n_h$ is equal to one of the two values $n_1$ and $n_2$.

11. A polarizing beam splitter as claimed in claim 8, characterized in that the compensating stack comprises at least one layer having an optical thickness equal to a multiple of half wavelengths of the light beam.

12. A polarizing beam splitter as claimed in claim 11, characterized in that the at least one layer has a refractive index equal to one of the two values $n_w$ and $n_h$.

13. A polarizing beam splitter as claimed in claim 8, characterized in that at least one layer of the compensating stack has a refractive index equal to one of the two values $n_w$ and $n_h$.

14. A polarizing beam splitter as claimed in claim 8, characterized in that the compensating stack comprises at least one layer having an optical thickness equal to a multiple of half wavelengths of the light beam.

15. A polarizing beam splitter as claimed in claim 2, characterized in that each layer of the polarizing stack and the compensating stack has an optical thickness equal to a quarter wavelength of the light beam.

16. A polarizing beam splitter as claimed in claim 2, characterized in that the polarizing stack comprises a plurality of successive layers alternately having a first refractive index $n_w$ and a second refractive index $n_h$, the value of $n_w$ being lower than the value of $n_h$.

17. A polarizing beam splitter as claimed in claim 2 wherein the angle of incidence on the polarizing stack of the incident light beam ranges between 20° and 80°.

18. A polarizing beam splitter as claimed in claim 2, characterized in that the beam splitter has a further substrate such that the polarizing stack is arranged between the two substrates.

19. A polarizing beam splitter of claim 1 wherein the angle of incidence on the polarizing stack of the incident light beam ranges between 20° and 80°.

20. A polarizing beam splitter as claimed in claim 1, characterized in that the beam splitter has a further substrate such that the polarizing stack is arranged between the two substrates.

21. A magneto-optic reading device for reading information stored on a magneto-optic record carrier, which device comprises a radiation source supplying a radiation beam, a polarizing beam splitter as claimed in claim 1, which is arranged in the path of the radiation beam between the radiation source and the record carrier and in the path of the radiation beam reflected by the record carrier for separating the reflected radiation beam from the radiation beam supplied by the radiation source, and a detection system arranged in the path of the reflected radiation beam behind the beam splitter for deriving an information signal from this beam.

22. A polarizing beam splitter as claimed in claim 1, characterized in that the compensating means comprise a compensating stack of thin layers having a surface opposing and in contact with a surface of the polarizing stack.

23. A polarizing beam splitter as claimed in claim 1 characterized in that each layer of the polarizing stack has an optical thickness equal to a quarter wavelength of the light beam.

24. A polarizing beam splitter according to claim 1, wherein said phase difference is incurred in the polarizing stack.

25. A polarizing beam splitter having a substrate provided with a polarizing stack for splitting a non-collimated light beam having a given wavelength and incident thereupon into two sub-beams having mutually different states of polarization, said polarizing stack comprising a plurality of successive thin layers alternately having a first refractive index $n_w$ and a second refractive index $n_h$, the value of $n_w$ being lower than the value of $n_h$, at least one of the sub-beams having two components of mutually orthogonal polarization, each component having a phase, the polarizing beam splitter comprising a compensating stack for compensating a difference between said phases, said compensating stack comprising a series of three successive layers having refractive indices of $n_1$, $n_2$, $n_3$, respectively, wherein $n_3 < n_2 < n_1$.

26. A polarizing beam splitter according to claim 25, wherein said phase difference is incurred in the polarizing stack.

27. A polarizing beam splitter as claimed in claim 25, characterized in that the refractive indices of the layers comply with the relations $n_w$ is equal to $n_3$, and $n_h$ is equal to one of the two values $n_1$ and $n_2$.

28. A polarizing beam splitter as claimed in claim 25, characterized in that the refractive indices of the layers comply with the relations $n_w$ is equal to $n_2$, and $n_h$ is equal to $n_1$.

29. A polarizing beam splitter having a substrate provided with a polarizing stack for splitting a non-collimated light beam having a given wavelength and incident thereupon into two sub-beams having mutually different states of polarization, said polarizing stack comprising a plurality of thin layers alternately having a first refractive index $n_w$ and a second refractive index $n_h$, at least one of the sub-beams having two components of mutually orthogonal polarization, each component having a phase, the polarizing beam splitter comprising a compensating stack for compensating a difference between said phases, said compensating stack comprising a series of three successive layers having refractive indices of $n_1$, $n_2$, $n_3$ respectively, wherein $n_3 < n_2 < n_1$.

30. A polarizing beam splitter according to claim 29, wherein said phase difference is incurred in the polarizing stack.

* * * * *